United States Patent
Lambert et al.

(10) Patent No.: US 9,928,295 B2
(45) Date of Patent: Mar. 27, 2018

(54) DOCUMENT RELATIONSHIP ANALYSIS SYSTEM

(71) Applicant: VortexT Analytics, Inc., Oak Ridge, TN (US)

(72) Inventors: Matthew Cody Lambert, Lenoir City, TN (US); Peter Joseph Angerani, Oak Ridge, TN (US); Gregory David Ostermayr, Knoxville, TN (US)

(73) Assignee: Vortext Analytics, Inc., Oak Ridge, TN (US)

( * ) Notice: Subject to any disclaimer, the term of this patent is extended or adjusted under 35 U.S.C. 154(b) by 374 days.

(21) Appl. No.: 14/611,624

(22) Filed: Feb. 2, 2015

(65) Prior Publication Data

US 2015/0220539 A1  Aug. 6, 2015

Related U.S. Application Data

(60) Provisional application No. 61/934,342, filed on Jan. 31, 2014.

(51) Int. Cl.
*G06F 17/30* (2006.01)

(52) U.S. Cl.
CPC .... *G06F 17/3071* (2013.01); *G06F 17/30696* (2013.01)

(58) Field of Classification Search
CPC ........... G06F 17/30631; G06F 17/3071; G06F 17/30696; G06F 17/30; G06F 17/30259; G06T 7/003; G06N 99/005; H04L 63/08
See application file for complete search history.

(56) References Cited

U.S. PATENT DOCUMENTS

| | | | | |
|---|---|---|---|---|
| 6,560,597 | B1 * | 5/2003 | Dhillon | G06F 17/3071 707/E17.058 |
| 6,629,097 | B1 * | 9/2003 | Keith | G06F 17/30598 707/E17.013 |
| 8,442,940 | B1 * | 5/2013 | Faletti | G06F 17/2785 704/9 |
| 2003/0007639 | A1 * | 1/2003 | Lambert | H04L 9/001 380/263 |
| 2003/0110181 | A1 * | 6/2003 | Schuetze | G06F 17/30713 707/E17.058 |

(Continued)

FOREIGN PATENT DOCUMENTS

WO  2011/035389 A1  3/2011

OTHER PUBLICATIONS

International Search Report and Written Opinion for PCT/US2015/014089 dated May 14, 2015.

*Primary Examiner* — Anh Ly
(74) *Attorney, Agent, or Firm* — Patterson Intellectual Property Law, P.C.; Grant M. Ford

(57) ABSTRACT

A document relationship analysis system. Aspects of the system include ingesting, discovering, recommending, analyzing, and exporting documents of interest. The system dynamically searches large or streaming datasets using a tiered, multi-step approach that includes discovery techniques and recommender components to filter and refine these larger datasets to smaller datasets of documents of interest. The system dynamically selects and renders an appropriate visualization for result datasets based on predetermined measures that allow for facilitate analysis of the documents of interest.

20 Claims, 11 Drawing Sheets

(56) References Cited

U.S. PATENT DOCUMENTS

| | | | |
|---|---|---|---|
| 2004/0049505 A1* | 3/2004 | Pennock | G06F 17/30592 |
| | | | 707/E17.058 |
| 2006/0200766 A1* | 9/2006 | Lakritz | G06F 15/00 |
| | | | 715/234 |
| 2007/0073748 A1 | 3/2007 | Barney | |
| 2011/0125767 A1* | 5/2011 | Moritz | G06Q 30/0277 |
| | | | 707/754 |
| 2011/0179002 A1* | 7/2011 | Dumitru | G06F 17/30864 |
| | | | 707/706 |
| 2011/0213655 A1* | 9/2011 | Henkin | G06Q 30/00 |
| | | | 705/14.49 |
| 2011/0258227 A1 | 10/2011 | Lacasse | |
| 2011/0271232 A1* | 11/2011 | Crochet | G06F 17/2211 |
| | | | 715/810 |
| 2011/0276577 A1* | 11/2011 | Yao | G06F 17/30867 |
| | | | 707/749 |
| 2012/0095748 A1 | 4/2012 | Li et al. | |
| 2012/0226715 A1* | 9/2012 | DeRose | G06F 17/30563 |
| | | | 707/792 |
| 2012/0254181 A1 | 10/2012 | Schofield et al. | |
| 2013/0159300 A1* | 6/2013 | Gallivan | G06F 17/30616 |
| | | | 707/730 |
| 2013/0246315 A1* | 9/2013 | Joshi | G06N 5/04 |
| | | | 706/10 |
| 2013/0332450 A1* | 12/2013 | Castelli | G06F 17/278 |
| | | | 707/722 |
| 2014/0372483 A1* | 12/2014 | Marmanis | G06F 17/30864 |
| | | | 707/776 |
| 2015/0324459 A1* | 11/2015 | Chhichhia | G06N 7/02 |
| | | | 706/12 |
| 2016/0117293 A1* | 4/2016 | Dettman | G06F 17/2264 |
| | | | 715/234 |

* cited by examiner

DOCUMENT RELATIONSHIP ANALYSIS SYSTEM

CROSS-REFERENCE TO RELATED APPLICATIONS

This application claims the benefit of U.S. Provisional Application No. 61/934,342, filed Jan. 31, 2014.

BACKGROUND

Various conventional systems exist for searching large volumes of electronic documents and displaying the results of those searches. For instance, keyword searches are a widely-used retrieval method for conducting general searches of electronic documents on the Internet. With keyword searches, a user typically retrieves a list of documents in response to entering one or more keywords into a search engine. The search engine runs a query against data collected during on-going crawls of web pages and returns documents containing the particular keyword(s) the user entered. Faceted searches allow users to search a set of documents by selecting various characteristics to serve as prerequisites. Moreover, conventional keyword and faceted searches often refine search results by allowing a user to manually select a document returned in the search results and then automatically constructing a new search query based on features (e.g., keywords) of the selected document to locate other documents similar to the selected document.

Internet keyword searches have limitations. First, web pages (i.e., documents), especially new or unpopular web pages, are infrequently re-crawled so information can be out of date. Second, web pages do not have a consistent format making content difficult to automatically discern. Third, web pages are organized based solely on the presence of a keyword in the document. Fourth, more precise keyword searches often require the construction of complex search queries using Boolean operators and field switches, which limits usability and makes it difficult for less technical users to find relevant search results. Individually and collectively, these limitations make keyword searches too restrictive. While a keyword search will generally return results (and, often, lots of results), there may be more relevant documents that are not returned by the query or appear far enough down the search results to be ignored by the user. In lay terms, you don't know what you don't know. It is with respect to these and other considerations that the present invention has been made.

BRIEF SUMMARY

Aspects of a system and method for analyzing relationship between documents, including large volumes of documents, are described herein. The document relationship analysis system provides for dynamically searching large or streaming datasets using a tiered, multi-step method that includes discovery techniques and recommender components to filter and refine these larger datasets to smaller datasets of documents of interest and for dynamically and temporally displaying datasets based on selected measures that allow for optimal visualization and analysis of the documents of interest.

The document relationship analysis system parallelizes the term weighting schemes allowing document vectors to be precomputed during the ingest process when retrieving source documents from static or streaming document sources. Precomputing the document vectors in such a fashion improves performance of the document relationship analysis system when executing and refining queries and visualizing results datasets by reducing the number of computations required during the vector comparison process and is scalable to an enterprise level.

The document relationship analysis system integrates a recommender component with a discovery component in a dataset manager component that clusters, stores, and manages datasets for further use and analysis within the document relationship analysis system and export to other systems for external use and analysis.

Additionally, the document relationship analysis system uses advanced visualizations to meaningfully display information about documents of interest within a target dataset of source documents. Visualizing connections within very large datasets is difficult, if not impossible given existing visualization techniques. The relationship analyzer component dynamically selects an appropriate visualization model that clusters the result dataset in way intended to optimize the presentation of the results to a user based on the amount of information being displayed, or other features of the results. This allows the document relationship analysis system to effectively communicate information about result datasets including small volumes of documents of interest, as well as large volumes of documents of interest.

The enhanced visualizations provided by the relationship analyzer component and other aspects of the present disclosure, allow for automation of a greater portion of the text analysis process than is possible with existing search and analysis tools. Accordingly, the document relationship analysis system is capable of displaying large volumes of documents with a level of clarity and ease of analysis never before possible. As a result, analysts are able to more efficiently perform their job, be it document triage, entity extraction, term matching, etc., in less time and with a better understanding of the results.

Other objects and advantages of the invention, besides those discussed here will be apparent to those of ordinary skill in the art from the detailed description which follows. In the description reference is made to the accompanying drawings, which form a part hereof, and which illustrate examples of the invention. This summary, the detailed description, and any examples are not intended to be exhaustive of the various aspects and embodiments of the invention. Therefore, reference is made to the claims which follow the description for determining the scope of the invention.

BRIEF DESCRIPTION OF THE DRAWINGS

Further features, aspects, and advantages of the present disclosure will become better understood by reference to the following figures, wherein elements are not to scale so as to more clearly show the details and wherein like reference numbers indicate like elements throughout the several views.

DETAILED DESCRIPTION

A document relationship analysis system and accompanying method is described herein and illustrated in the accompanying figures. Aspects of the system include ingesting, discovering, recommending, analyzing, and exporting documents of interest. The system dynamically searches large or streaming datasets using a tiered, multi-step approach that includes discovery techniques and recommender components to filter and refine these larger datasets to smaller datasets of documents of interest. The system dynamically selects and renders an appropriate visualization for result datasets based on predetermined measures that allow for facilitate analysis of the documents of interest.

Figure 1:
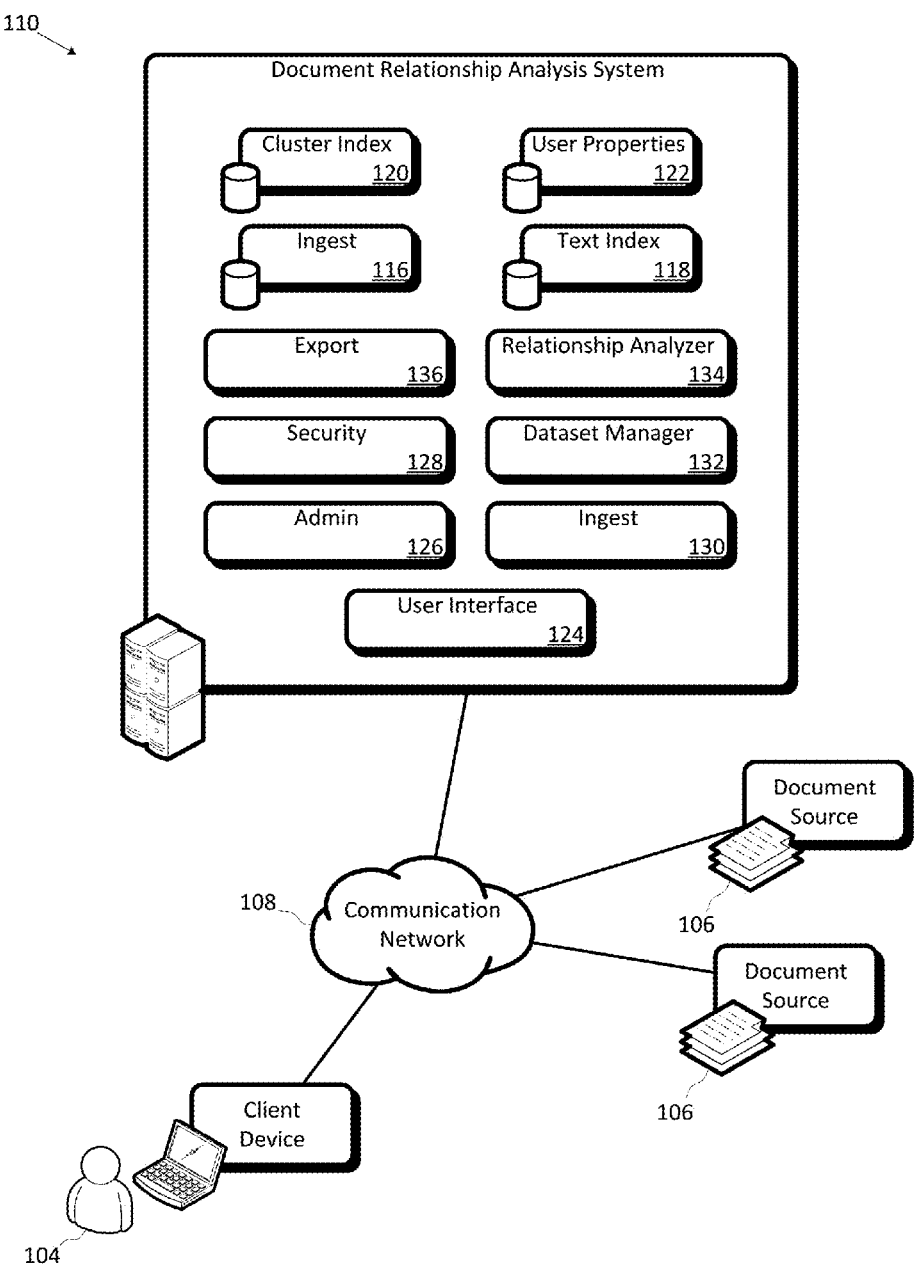
FIG. 1 is a simplified block diagram illustrating aspects of the document relationship analysis system in a typical operating environment.

FIG. 1 is a simplified block diagram illustrating aspects of the document relationship analysis system. The document relationship analysis system 110 is typically operated by an organization, government, or other organization that owns, controls, manages, or otherwise has access to a document collection that contains a large number (e.g., on an order of magnitude of thousands or even millions) of source documents 106. The source documents 106 may be related to a certain topic, obtained from a particular source, or compiled from a random sampling of publicly available documents.

Source documents 106 are ingested into the document relationship analysis system 110 to be searched and may or may not contain information of interest to a user 104. The document relationship analysis system 110 provides an efficient way for searching and filtering very large, dynamic datasets of structured and unstructured text and refining searches using discovery and recommender components to locate documents of interest (i.e., documents response to the query) within a selected dataset. The document relationship analysis system 110 further includes an output renderer for visualizing documents of interest using clustering algorithms that are applied based on selected measures of dataset size.

The source documents 106 are generally text-based documents or documents that may be converted into text (e.g., graphic images containing text that may be identified through optical character recognition). The source documents 106 are optionally grouped into electronic datasets. Moreover, the source documents 106 may be stored in any number of document formats. The document relationship analysis system 110 is intended to be data-agnostic with respect the types and file formats of the source documents 106. Accordingly, such formats may be open or proprietary, structured or unstructured, standardized or free form, common or uncommon, and editable or fixed. Examples of suitable formats for source documents include, without limitation, productivity application files (e.g., word processing, spreadsheet, presentation, note, or drawing files), plain text files (e.g., ASCII or Unicode files), markup language documents (e.g., XML, HTML, or JSON), email documents, portable document format and other platform independent files, delimited files (e.g., comma separated value files), and various image formats.

A basic implementation of the document relationship analysis system 110 includes an interface 124 (e.g., a user interface), an ingest component 130, a dataset manager component 132, a relationship analyzer component 134, and one or more databases for storing the ingested documents and data extracted, derived, calculated, or otherwise determined from the ingested documents. Some implementations of the document relationship analysis system 110 optionally include one or more of an admin component 126, a security component 128, and an export component 136.

The interface 124 includes control elements and display regions for communicating information to and receiving information from users of the document relationship analysis system 110 via one or more input modalities (e.g., typed. spoken, point/click, or drag/drop inputs) and one or more output modalities (e.g., visual or audible outputs of textual information and alerts or visual displays of graphical information). By way of example, the interface 124 may be implemented, without limitation, as a hypertext markup language (HTML) interface or a software application that runs in a web browser or a dedicated client application.

The admin component 126 controls authorizations and access to the document relationship analysis system 110 based on a configuration provided by a user or administrator. Examples of configuration elements maintained by and editable through the admin component 126, include external connections to a document source or the various databases (e.g., location/address, access credentials, roles, etc.) and user accounts (e.g., user names, passwords, permissions, roles, etc.). In various embodiments, access to the admin component 126 is provided through one or more of the interface 124, a portal, or web components.

The security component 128 permits or restricts access to the data contained within, the functionality provided by, and configuration of the document relationship analysis system 110 in accordance with permissions, roles, or other settings associated with user accounts or other criteria.

In the illustrated embodiment, the document relationship analysis system 110 includes an ingest database 116 storing information about the ingested documents 106, a text index database 118 (e.g., Apache Sole™) storing information about the contents of the ingested documents 106, a cluster index database 120 storing information used to identify relationships between documents 106, and a user properties database 122 storing user and/or session-specific information describing criteria used when analyzing the documents for relationships. The ingest database 116 stores information associated with the documents 106 that have been ingested into the document relationship analysis system 110, such as, but not limited to, file properties of the source documents 106, unique identification labels assigned to the source documents 106, and copies of the source documents 106.

The text index database 118 stores information calculated, determined, or derived from source documents 106 by the document relationship analysis system 110, such as, but not limited to, document properties, the extracted text, and the text index for the extracted text. The cluster index database 120 stores calculated, determined, or derived from source documents 106 by the document relationship analysis system 110, such as, but not limited to, processed text and computed document vectors in a cluster index database 120. The user properties database 122 stores information, such as, but not limited to, user properties, lists of users, user datasets, and user-provided profile documents. The description of the databases and the data stored therein are intended to be illustrative and not limiting. More or fewer databases may be used. While data is described as being stored in a particular database in the context of a representative embodiment, any or all of the data may be stored in one of the other databases or an entirely new database.

The document relationship analysis system 110 is implemented using a combination of hardware and software components cooperatively forming a special purpose machine providing the functionality described herein. The various components of the document relationship analysis system 110 are optionally implemented in a local architecture using a single machine or in a distributed architecture using multiple machines in communication via the communications network 108. For example, the document relationship analysis system 110 may be implemented using an application server or server farm accessible from a client device. The application server, the client device, and components of the document relationship analysis system 110 are generally represented by the computing device 1200 described hereinafter. The document relationship analysis system 110 optionally employs multiple instances of any of the components operating in series or parallel, as appropriate. Likewise, applications and data used by the document relationship analysis system 110 are stored locally or remotely in one or more physical or logical storage devices providing short-term or long-term storage, as appropriate. Examples of a suitable communications network include, without limitation, wired telecommunications, satellite, microwave, or other suitable wireline or wireless networks, or a combination of the preceding.

Figure 2:
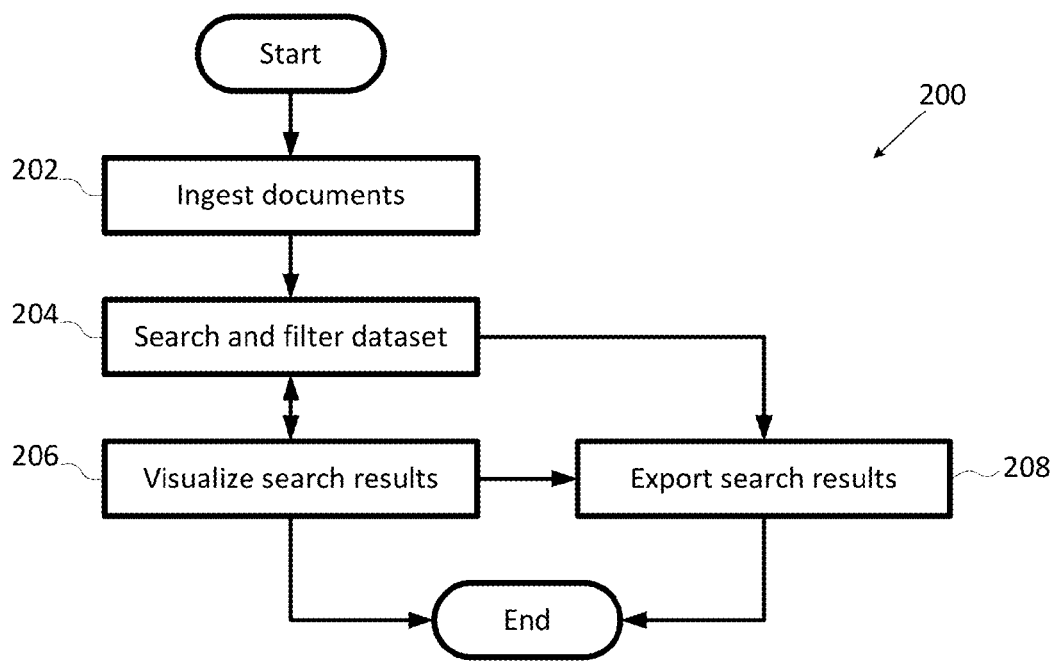
FIG. 2 is a high level flowchart illustrating aspects of the general method performed by the document relationship analysis system.

FIG. 2 is a high level flowchart illustrating aspects of the general method performed by the document relationship analysis system. The method 200 includes operations corresponding to the components of the basic implementation of the document relationship analysis system 110. The method begins with an ingest operation 202 in which the ingest component 130 retrieves and processes source documents to transform the content and generate feature information used for searching and filtering the documents. Next, a search operation 204 performed by the dataset manager component 132 searches and filters a dataset containing selected documents to generate a result set containing documents of interest based on a query or similarities to one or more profile documents. Finally, a visualization operation 206 performed by the relationship analyzer component 134 determines relationships between the documents in the result set and, optionally, the profile documents when applicable and displays the results in using clustering techniques selected based on criteria such as the number of documents in the result set and the similarities between documents. An optional export operation 208 performed by the export component 136 allows information maintained or generated by the document relationship analysis system 110 to be sent to other applications or devices for use, analysis, or storage.

The ingest operation 202, the search operation 204, the analysis operation 206, and the export operation 208 are discussed in further detailed below.

Figure 3:
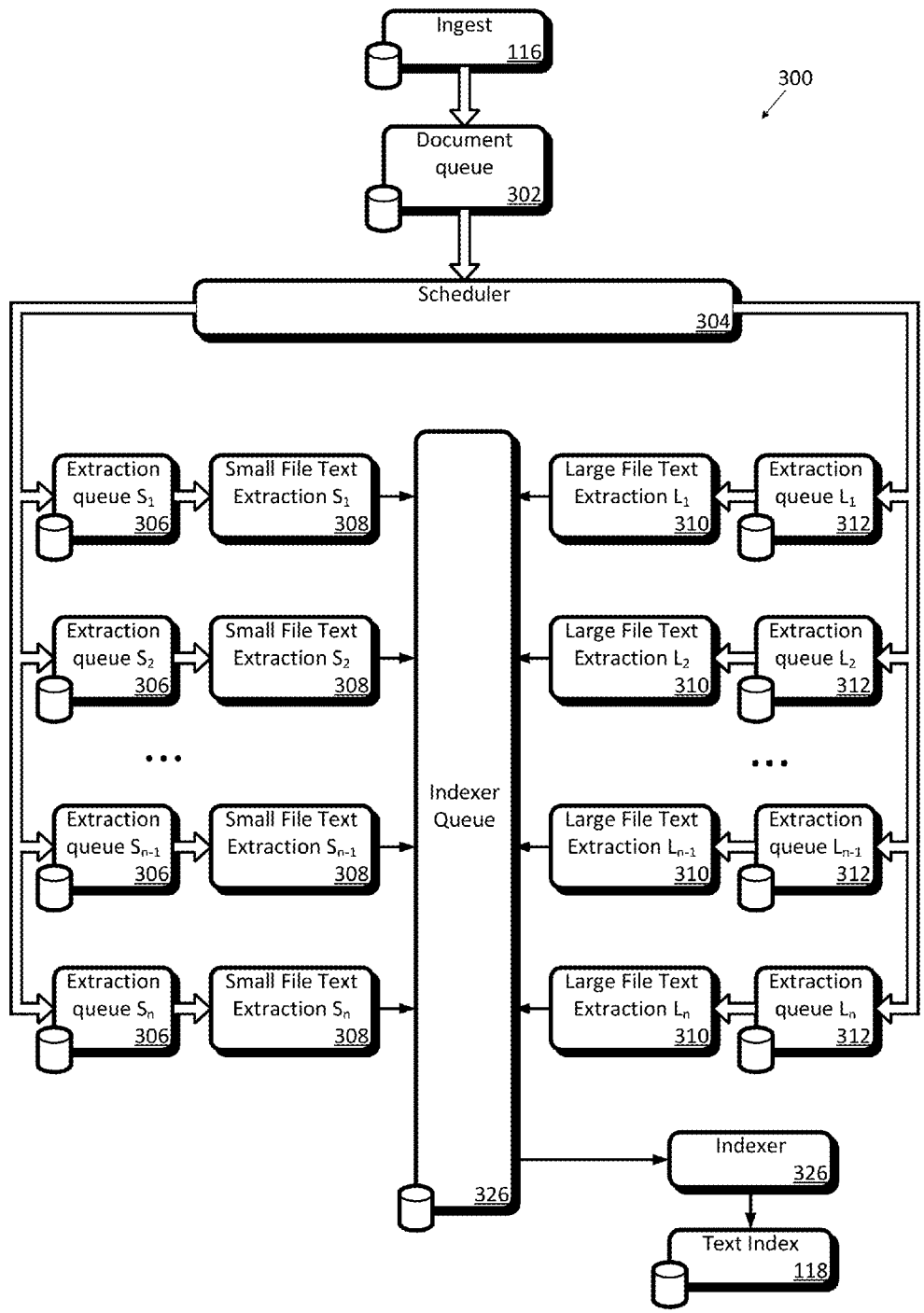
FIG. 3 is a flow diagram illustrating aspects of the operation of the text extraction pipeline of the ingest component.

FIG. 3 is a flow diagram illustrating aspects of the operation of the text extraction pipeline of the ingest component. The text extraction pipeline 300 includes a document queue 302, scheduler 304, and one or more text extraction components 308, 310, one or more extraction queues 306, 312, and an indexing queue 328. The document queue 302 identifies source documents 106 in the ingest database 116 from which text has not been extracted. The extraction queues hold documents scheduled to be processed by a selected text extraction component 308, 310.

In the illustrated embodiment, each text extraction component has a separate queue, but queues may be shared by one or more text extraction components 308, 310. In various embodiments, some of the text extraction components are small file text extraction components, which are optimized for extracting text from small files and other text extraction components are large file text extraction components, which are optimized for extracting text from large files.

While one embodiment has been illustrated, the schedule 304, the extraction queues, and the text extraction components may be reconfigured so that each document 106 is processed by the text extraction pipeline 300 independently according to its file properties (e.g., file type or size) allowing the ingest component 130 to be optimized for performance purposes.

Figure 4:
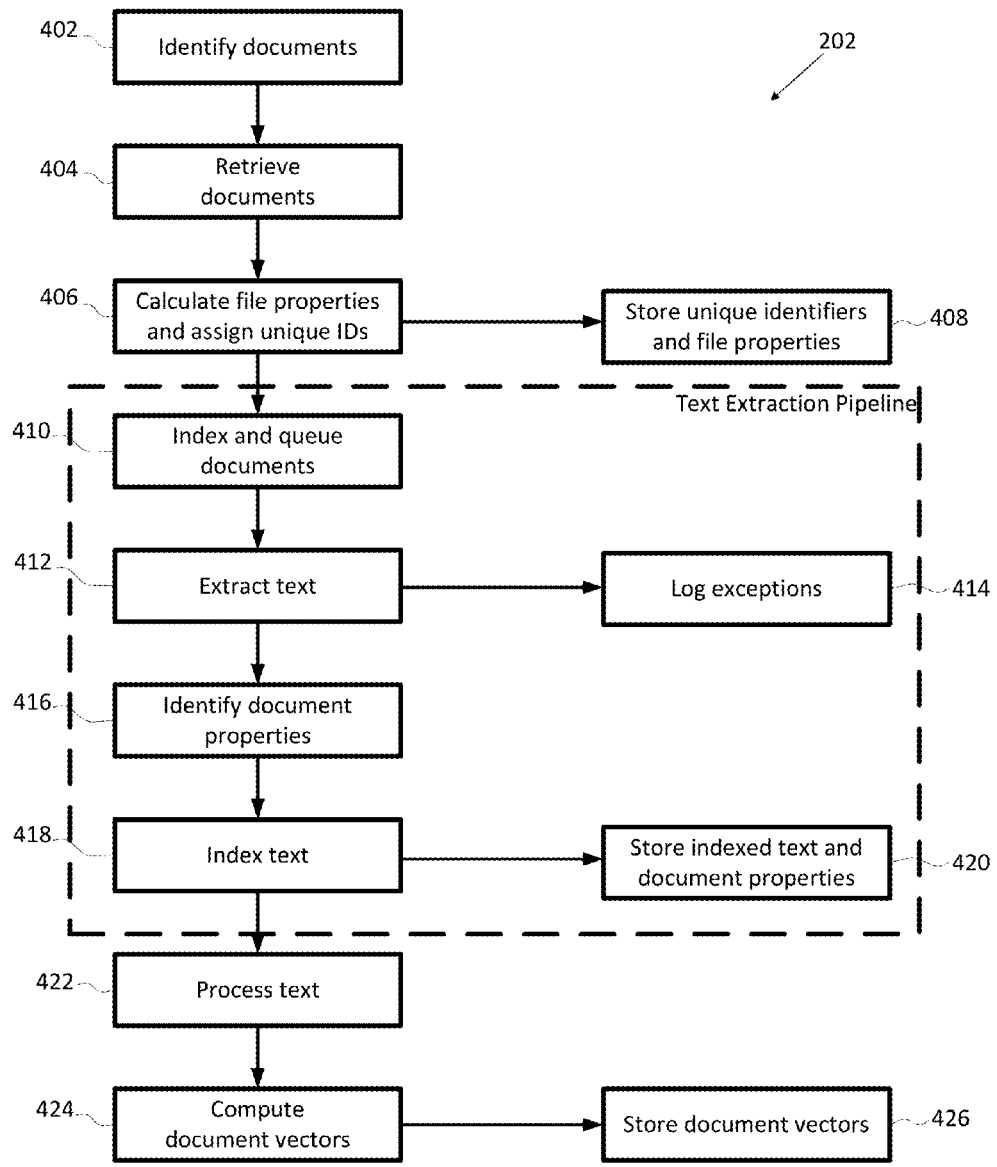
FIG. 4 is a high level flowchart illustrating aspects of the ingest operation performed by the ingest component.

FIG. 4 is a high level flowchart illustrating aspects of the ingest operation performed by the ingest component. In the illustrated method, operations 410 through 420 correspond to the operation of the text extraction pipeline 300.

The ingest operation 202 begins with a source selection operation 402 in which the ingest component 130 receives an identification of source documents 106 or a location containing source documents 106 to be ingested. In various embodiments, the documents to be ingested are identified via the interface 124. For example, the source documents 106 may be identified by entering a location (e.g., a universal resource locator) of the source documents, dragging a source container (e.g., a folder) or source documents from a source location and dropping them into the interface 124, pointing and clicking on source documents (e.g., via a file dialog of the interface), or some other appropriate identification or selection modality.

In a document retrieval operation 404, the ingest component 130 retrieves the identified source documents 106. In some embodiments, all identified source documents 106 at a particular location are retrieved during the document retrieval operation 404, while in other embodiments, only a subset of the identified source documents 106 at a particular location. For example, a source document location may be identified, but only selected documents from that location are retrieved (e.g., using a file filter).

The document relationship analysis system 110 is capable of retrieving documents from a static source such as a hard drive or other computer readable media, database, etc. In various embodiments, the document relationship analysis system 110 is also configured to retrieve documents on an iterative basis from a streaming data source, such as and without limitation, Internet network traffic, RSS feeds, incoming emails, etc.

In a file identification operation 406, the ingest component 130 identifies file properties and assigns unique identification labels to the retrieved source documents 106. Examples of the types of file properties identified by the ingest component 130 include, but are not limited to, metadata regarding some or all of the file's size, type, language, starting folder, user-defined source name, and text index database destination, as well as any optional filtering parameters describing the files and their locations. The identification labels assigned by the ingest component 130 act as a unique fingerprint for each ingested source document 106. In various embodiments, the ingest component 130 uses a cryptographic hash function (e.g., SHA-1 or MD5) to generate the unique identification labels. Passing unique identification labels instead of entire text files reduces the amount of time, bandwidth, memory, and storage usage needed to process the documents.

In a property storage operation 408, the ingest component 130 stores the identified file properties and unique identification labels in the ingest database 116. The ingest component 130 optionally stores copies of the retrieved documents in the ingest database 116.

An extraction queue operation 410, the ingest component 130 iterates through and creates an indexed list of all source documents 106 retrieved by the document relationship analysis system 110. The ingest component 130 then adds these indexed documents to the document queue 302 for further processing.

In a text extraction operation 412, the document relationship analysis system 110 extracts text from the documents 106 in the document queue 302 using at least one text extraction component (e.g., a text extraction interface or library) and any appropriate indexing filters for the document format (e.g., Windows IFilters, Java®). The path each source document 106 takes through the text extraction pipeline is based on relevant criteria, such as, but not limited to, the file properties of the source document 106 the current state of the text extraction interface. The scheduler 304 makes the path determination using one or more decision components, such as, but not limited to, a decision tree, a set of rules, or a statistical model, and routes source documents 106 to the appropriate text extraction interface. In various embodiments, the scheduler adds the source document to an extraction queue for processing by the selected text extraction component.

Text extraction begins with the scheduler 304 discovering the scheduling parameters for routing documents among the available text extraction components. Examples of scheduling parameters used by the scheduler include, without limitation, some or all of a minimum document size for extraction via a large file text extraction component (MINSIZE), a maximum document size for extraction via a small file ingestion component (MAXSIZE), a targeted minimum percentage of large files (MINPCT), a targeted maximum percentage of large files (MAXPCT), a blacklist (i.e., exclusions) for each text extraction component (e.g., unsupported file types and other features or conditions for which the text extract extraction component is not designed or that will or are likely to result in failure to extract text), and a whitelist for each text extraction component (e.g., supported file types and other conditions or features for which the text extraction component is designed). The scheduler is configured with pre-set (i.e., default) scheduling parameters, which are optionally tunable. In various embodiments, the scheduling parameters are adjustable via the interface 124 allowing a user to tune performance of the scheduler. The scheduler optionally automatically tunes some or all of the parameters based on analysis of the documents in the document queue 302. For example, the scheduler may calculate values for MINSIZE and MAXSIZE based on an average or median file size of the documents waiting for text extraction. In another example, the scheduler may automatically create an exclusion when exclusions based on file properties or other features if a particular text extraction component consistently logs exceptions (e.g., consistently fails to extract text from documents having a particular language, code page, file format, etc.).

Next, the scheduler 304 retrieves the indexed list of source documents 106 to be processed by the text extraction pipeline from the document queue 302, along with corresponding metadata (e.g., the file size and type of each source document 106). The scheduler 304 separates the source documents 106 into lists based on an evaluation of features of the source documents 106 against the scheduling parameters (e.g., via a set of rules applying the scheduling parameters).

In various embodiments, the scheduler 304 initially filters the source documents 106 using the blacklists to remove source documents 106 that cannot be processed or have a low chance of successful processing and/or the whitelists to include source documents 106 that can be processed or have a high chance of successful processing. Optionally, the scheduler 304 can demote or deprioritize some or all blacklisted documents (e.g., documents with some chance of successful processing) and attempt to extract the text during times of low utilization. Similarly, whitelisted documents can be promoted or prioritized for processing before other documents (e.g., documents that are neither whitelisted or blacklisted). Alternatively, the scheduler 304 initially separates the source documents 106 based on file size and/or other features before determining if the source document is blacklisted or whitelisted. In various embodiments, blacklist or whitelist screening is performed by the text extraction components.

When multiple text extraction components are available, some embodiments of the scheduler 304 route source documents 106 to text extraction components based on the number of source documents 106 in the corresponding extraction queues at any given time in order to optimize performance of the ingest component.

For each list, with the general exception of blacklisted documents, the scheduler 304 sends the source documents 106 with a file size less than or equal to MINSIZE to one of the small file text extraction components and the source documents 106 with a file size greater than or equal to MAXSIZE to one of the small file text extraction components. Next, the scheduler 304 calculates a weighted average of the target percentages MINPCT and MAXPCT. By way of example, one suitable weighted average calculation is:

$$PCT = \frac{((n-1) \times MINPCT) + MAXPCT}{n} \quad (1)$$

The scheduler 304 then converts the weighted average of the percentage into a number of files (NUMFILES) based on the number of the source documents 106 remaining on the list (i.e., files with file sizes between MINSIZE and MAXSIZE). The scheduler 304 sorts the list by file size and sends the calculated number (NUMFILES) of the largest source documents 106 to the list to one of the large file text extraction components and the remainder to one of the small file text extraction components.

In the event a particular text extraction component is unable to extract text from a source document 106, the ingest component 130 optionally makes one or more additional attempts to extract the text using the same extraction component or routing the source document 106 to a different text extraction component. In various embodiments, a notification is sent to the scheduler 304 when text extraction fails and the scheduler 304 reschedules text extraction for the source document 106. In some embodiments, the text extraction component returns the source document 106 for which extraction failed to the extraction pipeline where it is automatically added to the next queue.

In various embodiments, the final text extraction component employs a specialized encoded character detection procedure for attempting to extract text from a source document that cannot be processed by any other text extraction component in the text extraction pipeline 300. The final text extraction component utilizes one or more character (or encoding) detectors for various languages. Examples of character detectors are the many implementations of Char-Detect. The final text extraction component selects character detectors for one or more selected languages, a run length (N), and the source document. A number of small buffers (length=2*(N+1) bytes) are set up, one for each character detector to be called.

The final text extraction component reads through the source document one byte at a time and applies the encoding detectors for the selected languages to each byte. The character detectors retrieve the previous 2N bytes and the current look-ahead byte. The buffer for each character detector advances one byte between calls. Additionally, the character detectors are supplied with a parameter indicating whether the byte is an even byte or an odd byte. If a run of Nprintable characters (e.g., ASCII codes 22-128) is detected, the run is considered to be text and the results are written to an output stream until the character detector encounters a non-printable character. When a non-printable character is encountered, a special character or string of characters (e.g., " . . . ") is written to the output stream to indicate the termination of the text run. This process continues until the final text extraction component reaches the end of the source document 106.

The character detector optionally passes state information back to the final text extraction component, which, in turn, is handed back to the same character detector on the subsequent call. This private state allows the character detector to re-align itself for multi-byte character sequences.

In an optional exception logging operation 414, the ingest component logs an exception for any source document 106 where text extraction fails. Exceptions are optionally reported via the interface 124.

In a document property discovery operation 416, the ingest component 130 discovers document properties of each source document 106 from which text was successfully extracted. Examples of document properties collected by the ingest component include, but are not limited to, a document's entities, language, or categories. Entities are identifiable patterns in the text, such as and without limitation, formatted numbers, proper nouns, words expressing sentiment, words that do not exist in the dictionary, etc. For example, these patterns may correspond to credit card numbers, emails, phone numbers, or social security numbers.

The ingest component utilizes one or more language detection libraries. One such language detection library developed by Cybozu Labs, which works by assessing the probability of each character in a document appearing in a particular language and summing these probabilities to determine the most probable language. The definition of a character assumes a code page (e.g., ASCII, Latin1, UTF16), and the language probabilities for a document are highly dependent on the code page. However, the code page must be chosen prior to determining the language. Further, non-alphanumeric binary information used in some file formats (e.g., Microsoft® Word documents) severely degrades the language detection performance.

Language detection performance is improved by assessing the probabilities using some or all of the available code pages and recording the probabilities for the adoption of a particular code page along with the language. Next, the extracted text is analyzed using a dictionary lookup for common or interesting phrases in a particular language. The probabilities of the extracted text are measured against the documents in each language to determine the most probable language/code page combination using the recommender/clustering component to determine the best matches. Finally, the language detection component applies machine learning using statistical models or other analytical techniques to make the language determination for the complete set of documents (dataset) and not just on an individual document basis. For example, given a particular document, the ingest component extracts the text using three code pages. Using a set of representative documents in a number of languages for each code page, the ingest component calculates the probabilities of a match for each document across the dataset and uses that to determine the most probable language.

In an indexing operation 418, the ingest component 130 indexes the extracted text via the text index ingest component 328. The text index provides scalability and performance of full-text and filtered queries within the discovery component of the dataset manager component.

In a storage operation 420, the identified document properties and the indexed text/text index are stored together in the text index database 118 for use and further analysis by the document relationship analysis system 110.

In a pre-processing operation 422, the extracted text is processed by the ingest component 130 by stemming words and removing stop words. In some embodiments, the extracted text undergoes natural language processing during the pre-processing operation 422. Processing the extracted text at ingest, rather than when a query is executed (i.e., pre-processing the extracted text) is beneficial because it reduces the amount of computations required during the vector comparison process, which allows the document relationship analysis system 110 to compute similarity values and document vectors more rapidly and produce result datasets in a responsive and timely manner.

In a vector calculation operation 424, the ingest component 130 computes document vectors using the indexed, extracted text stored in the text index database 118. As with pre-processing the extracted text, computing document vectors prior to when a user executes a query via the dataset manager component 132 (i.e., pre-computing document vectors) is beneficial because it allows the document relationship analysis system 110 to cluster documents more rapidly and facilitating analysis and visualization of result datasets in a responsive and timely manner. A document vector is a mathematical representation of the term frequencies of a document. The ingest component 130 calculates document vectors by applying a term-weighting scheme to each of the ingested source documents 106.

Through local and global term-weighting schemes, document clustering is adaptable to compare the similarity of one document to another. The document relationship analysis system 110 utilizes one or more clustering techniques for organizing documents into similar groups of documents. Many clustering approaches are available, such as and without limitation, Ward's Method, which initially treats each document as a cluster. Among all cluster pairs, the method then locates the most similar pair of clusters using the dissimilarity matrix, and agglomerates this pair of clusters into a single cluster. This dissimilarity matrix is then updated to reflect the merged clusters, and this merging process is repeated until all of the documents are in a single cluster. Examples of suitable clustering techniques for use with the document relationship analysis system 110 are described in U.S. Pat. No. 7,693,903 ("A Method for Gathering and Summarizing Internet Information"), U.S. Pat. No. 7,805,446 ("Agent-based Method for Distributed Clustering of Textual Information"), and U.S. Patent Application 2013/0339373 ("Method and System of Filtering and Recommending Documents"). The term weighting schemes used by the ingest component 130 when computing document vectors is configurable via the interface 124, thereby allowing the document relationship analysis system 110 to be optimized or adjusted based on various factors, such as user preference or analysis requirements.

The ingest component 130 employs at least one clustering algorithm applying a vector space model (VSM) or other term weighting scheme to return search results. The VSM relates terms to documents, and, because different terms have different importance within a given document, a term weight is associated with every term, usually based on the frequency of such term within a document. Using clustering algorithms and the VSM allows the document relationship analysis system 110 to organize documents of interest based on their similarity to each other. Examples of suitable VSMs include, without limitation, Term Frequency—Inverse Document Frequency (TF-IDF) and Term Frequency—Inverse Corpus Frequency (TF-ICF). Using clustering algorithms and VSMs allows the documents of interest to be organized based on their similarity to one another.

TF-IDF is a term weighting scheme used to cluster documents when the number of documents in which a term occurred at least once (document frequency) is known. TF-IDF requires a prior knowledge of the data in a dataset that does not change during the calculation of term weights. TF-IDF is suitable for calculating document vectors when the number of documents to be ingested is relatively small (e.g., less than a million) or static in nature.

TF-ICF is better suited for calculating document vectors when the number of documents to be ingested is relatively large or streaming in nature, because TF-IDF is not computationally feasible on streaming datasets. TF-ICF is a numerical statistic that weights the importance of a term to a document within a corpus, independent of the number of documents in the corpus containing the term. The TF-ICF value increases proportionally to the number of times a word appears in the document, but is offset by the frequency of the word within the corpus (the inverse corpus frequency), which compensates for some words or terms being generally more common than others. TF-ICF addresses the problem of finding and organizing information from dynamic document streams.

It does not require term frequency information from other documents within the set, and so it may process document vectors of n streaming documents in linear time. TF-ICF generates document representations independently without knowledge of the document stream being examined, so its computational complexity is $O(n)$ instead of $O(n^2)$ for TF-IDF. The use of TF-ICF reduces computation time because the ingest component 130 does not have to continuously process the full set of documents ingested from a streaming source. In one embodiment, TF-ICF calculations may be performed in a distributed manner using a map reduce framework (e.g., Apache™ Hadoop®).

In various embodiments, the document relationship analysis system 110 parallelizes the TF-ICF processing on multiple application servers so that document vectors may be pre-computed during the ingest process. Pre-computing the document vectors in such a fashion improves performance of the ingest component of the present disclosure by reducing the number of computations required during the vector comparison process performed later by the system. This technique for ingesting large volumes of documents is scalable to an enterprise level.

In a vector storage operation 426, the ingest component 130 stores the document vectors in the cluster index database 120 for subsequent use by the dataset manager component 132 and/or other components of the document relationship analysis system 110.

The following examples demonstrate aspects of the text extraction pipeline 300 and operations 410 through 420 of the ingest operation 202 and are not intended to limit the disclosure to the details. In each example, a source document 106 is retrieved by the ingest component 130, stored in the ingest database 116, and indexed and placed in the document queue 302 for text extraction. The dataset manager component 132 in the examples is configured with a MINSIZE of 1 MB and a MAXSIZE of 1024 KB. The file properties determined by the ingest component include information about the document's file type and size.

In the first example, the document is a plain text file with a file size of 68 KB. The scheduler 304 determines this document is a supported file format (i.e., not blacklisted) for one or more of the text extraction components and that its size is less than MAXSIZE Accordingly, the scheduler 304 routes the document to the small file text extraction path and adds the document to the extraction queue 306 of small file text extraction component $S_1$. Small file text extraction component $S_1$ successfully extracts the text, which is sent to the index queue 326 to be processed by the text index component 328. Once indexing is completed, the indexed text is stored in the text index database 118.

In the second example, the document is a word processing application file with a file size of 2.7 MB. The scheduler 304 determines this document has a size is greater than MINSIZE. Accordingly, the scheduler 304 routes the document to the large file text extraction path and adds the document to the extraction queue 306 of large file text extraction component $L_1$. The large file text extraction component $L_1$ does not support the word processing application file and fails to extract the text. Accordingly, the source document is placed in the extraction queue for the next large file extraction text component (e.g., large file text extraction component $L_2$). Large file extraction text component $L_2$ successfully extracts the text, which is sent to the index queue 326 to be processed by the text index component 328. Once indexing is completed, the indexed text is stored in the text index database 118.

In the third example, the document is a word processing application file with a file size of 2.7 MB. The scheduler 304 determines this document has a size is greater than MINSIZE. Additionally, the scheduler 304 determines this file format is blacklisted by large file extraction text component $L_1$ but not by large file extraction text component $L_2$. Accordingly, the scheduler 304 routes the document to the large file text extraction path and adds the document to the extraction queue 306 of the large file extraction text component $L_2$. Large file extraction text component $L_2$ successfully extracts the text, which is sent to the index queue 326 to be processed by the text index component 328. Once indexing is completed, the indexed text is stored in the text index database 118.

In fourth example, the document is a word processing application file with a file size of 2.7 MB. The scheduler 304 determines this document has a size is greater than MIN-SIZE Additionally, the scheduler 304 determines this file format is supported by large file extraction text components $L_2$, $L_{n-1}$, and $L_n$. The scheduler 304 then examines the extractions queues for each of the large file extraction text components that support the document and determines that large file extraction text component $L_2$ has the shortest queue based on a selected measure (e.g., number of documents queued, sum of queued file sizes, etc.). Accordingly, the scheduler 304 routes the document to the large file text extraction path and adds the document to the extraction queue 306 of the large file extraction text component $L_2$. Large file extraction text component $L_2$ successfully extracts the text, which is sent to the index queue 326 to be processed by the text index component 328. Once indexing is completed, the indexed text is stored in the text index database 118.

In fifth example, the document has an unknown file format with a file size of 821 KB. The scheduler 304 determines this document has a size is less than MAXSIZE Accordingly, the scheduler 304 routes the document to the small file text extraction path and adds the document to the extraction queue 306 of small file extraction text component $S_1$. Small file extraction text component $S_1$ fails to extract the text and the document is added to the extraction queue 306 for the next small file extraction text component. The next small file extraction text component also fails to extract the text and this scenario repeats until the document finally reaches the final small file extraction text component, $S_n$, which utilizes the encoded character detection process described above. If successful, the extracted text is sent to the index queue 326 to be processed by the text index component 328. Once indexing is completed, the indexed text is stored in the text index database 118. If unsuccessful, an exception is optionally generated to notify users of the failed attempt.

Figure 5:
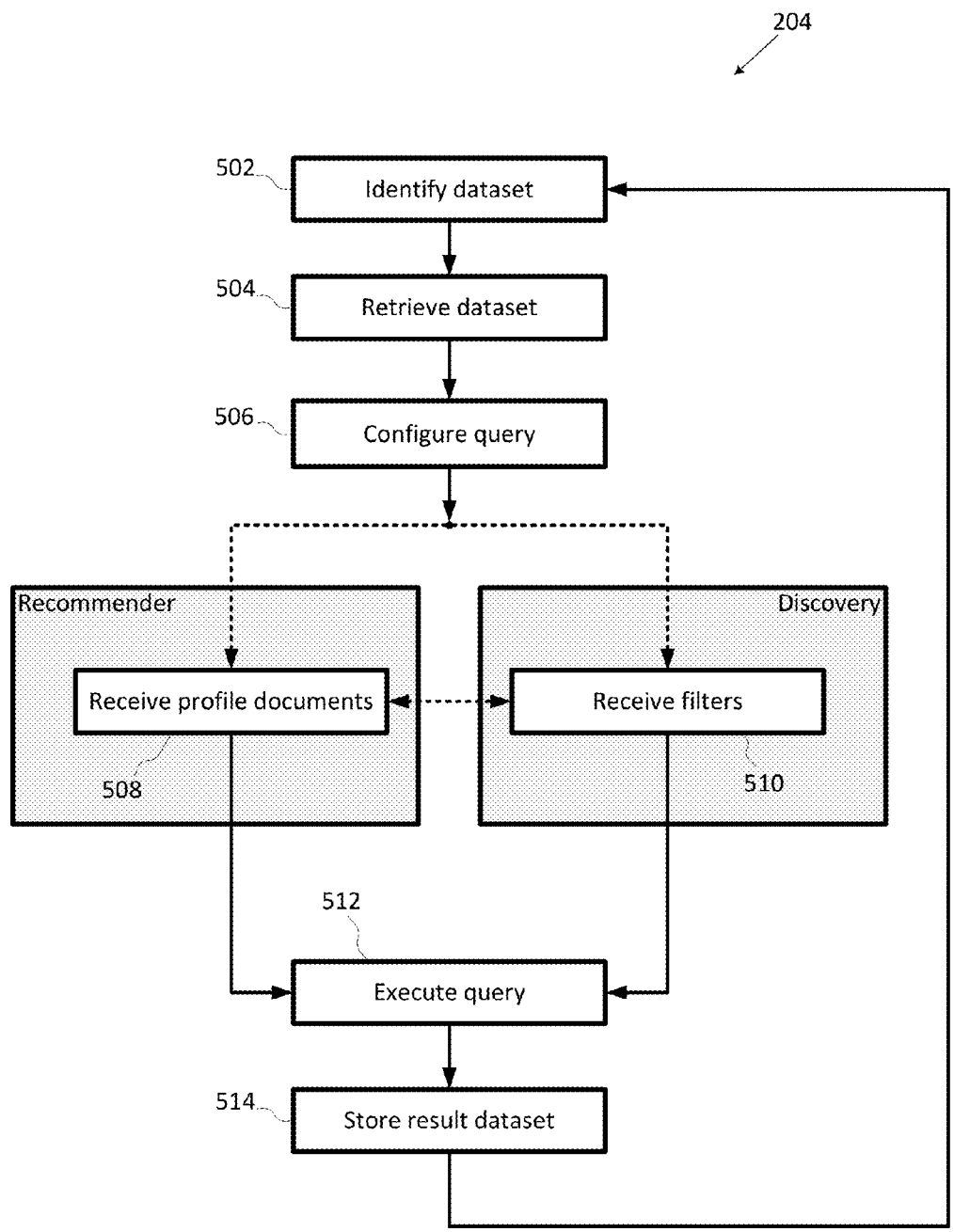
FIG. 5 is a high level flow chart illustrating aspects of the search operation performed by the dataset manager component.

FIG. 5 is a high level flow chart illustrating aspects of the search operation performed by the dataset manager component. The search operation 204 begins with a dataset selection operation 502 in which the dataset manager component 132 receives identification, via the interface 124, of a dataset to be searched. In some embodiments, the identified dataset may be all or a subset of the source documents 106 ingested using the ingest component 130. Any documents or datasets stored by the document relationship analysis system 110 are selectable.

In a retrieval operation 504, the dataset manager component 132 retrieves the identified dataset from the appropriate database. In various embodiments, the dataset manager component 132 selectively retrieves corresponding datasets of indexed text from the text index database 118, pre-computed document vectors from the cluster index database 120, or results stored in the user properties database 122 corresponding and in addition to the identified dataset depending on the type of query to be executed. The retrieved datasets selectively include some or all of the documents 106 ingested into the document relationship analysis system 110. Having pre-computed document vectors available for retrieval from the cluster index database 120, significantly reduces the number of computations that must occur to obtain results when executing a query, which leads to faster returns of query results and a reduction in the time needed for users to generate and refine result datasets for analysis.

In a query configuration operation 506, the dataset manager component 132 receives inputs via the interface 124 to create a query for execution against the retrieved dataset(s) (i.e., target dataset), which includes the identified dataset (e.g., the extracted text for selected source documents or a previous result dataset) and any ancillary data (e.g., indexed text, document properties, or file properties). The dataset manager component 132 includes a recommender component and a discovery component for handling two distinct types of queries. The recommender component and the discovery component utilize different inputs and datasets. Queries are selectively executed by either or both of the recommender component and the discovery component, as appropriate. The recommender component and the discovery component may operate independently or in parallel with each other based on inputs provided by the user and/or the configuration of the dataset manager component 132. Additional queries may be executed by either or both of the recommender component and the discovery component against result datasets generated using either of the recommender component and the discovery component. The dotted lines represent the optional data flow paths available with the recommender component and the discovery component.

The recommender component filters documents of interest more efficiently than simply executing a query using the discovery component. The recommender component characterizes features of the source documents and denotes the importance of each feature against a content-based user profile using a variety of techniques, such as vector comparisons. The purpose of the recommender component is to generate meaningful recommendations of other items in a collection that may be of interest based on an information (i.e., a profile) provided to the recommender component (e.g., selection/rating of other items, preferences, previous queries or other historical information, etc.). One example of suitable a recommender component is disclosed in U.S. Patent Application 2013/0339373, titled "Method and System of Filtering and Recommending Documents" by Thomas Potok, et al.

The document relationship analysis system 110 is not limited to using a single type of recommender component, but instead may choose from a plurality of recommender components that filter documents of interest into result datasets using a plurality of vector comparison techniques. In various embodiments, the recommender components are integrated with clustering components via the dataset manager component 132 to store and manage datasets for use by the relationship analyzer component 134.

In a profile gathering operation 508, the dataset manager component 132 receives an input of at least one profile document for similarity comparison purposes when a query is created for the recommender component. A profile document is a known document of interest that is identified to serve as the basis for comparison against other source documents in order to return query results that are similar in content to the profile document. Profile documents are ingested by the ingest component 130 in the same manner previous described for source documents 106.

When multiple profile documents are available to the dataset manager component 132, the profile document may optionally be used to generate a single, combined document vector representing all of the selected profile documents or used to generate a plurality of individual profile document vectors for similarity comparisons. Profile document vectors are computed upon ingest in the same manner that document vectors are computed for source documents 106. As with the computation of document vectors for ingested source documents 106, document vectors computed for ingested profile documents are computed using TF-IDF, TF-ICF, or another suitable term-weighting scheme. The dataset manager component 132 uses the combined profile document vector to generate a coarse-grain, filtered result dataset and the plurality of individual profile document vectors to generate a fine-grain, categorized result dataset. The filtered or categorized result datasets are generated by the recommender component are used for analyzing relationships between documents.

The recommender component compares source document vectors with one or more profile document vectors, as described above, to produce a set of similarity values that correspond to each comparison. This set of similarity values is optionally ranked and sorted to filter the target dataset. The filtered dataset is one type of result dataset generated by the dataset manager component.

In various embodiments, the recommender component is configured to introduce variability into the recommendation process, thereby ensuring that result datasets are not strictly bound to precise terms. The recommender component leverages distributed representations of words learned by neural networks through parallel methods. Employing this type of recommender component allows large datasets to be efficiently modelled at a low computational cost, and accurately provides similarity between words that goes beyond simple syntactic regularities. In such an embodiment, profile documents are passed through the neural network prior to the recommender component to obtain similar words, and the results are used in addition to or in conjunction with the original words contained within the profile documents. In one embodiment, this type of recommender component is implemented as a profile document multiplexer that creates multiple profile documents prior to the recommender component process. As an aid in controlling the number of results introduced, the words that are used in the process may be restricted to top weighted terms, top x matches, terms within y ranges (e.g., words, clauses, sentences, paragraphs, etc.) of the original word, and/or limited to atomic elements identified by named-entity recognition. The combined performance of the neural network model learning, similarity identification, and various types of recommender components, especially TF-ICF, provides a highly desirable solution that efficiently identifies relevant documents that may contain similar but not necessarily identical words.

In a filtering operation 510, the dataset manager component 132 receives an input of an optional filter for including or excluding documents when a query is created for the discovery component. Suitable filters for use by the discovery component include, but are not limited to, groups, facets, tags, and keywords. If no filter is provided, the dataset manager component 132 executes a query that automatically returns a result dataset equal to the target dataset allowing the relationships between all documents in the target dataset to be analyzed.

In various embodiments, the discovery component employs supervised learning entity tagging (SLET) to alleviate issues found in common named-entity recognition systems. SLET involves estimating entities and continuously improving this estimate based on a user-feedback loop. In one embodiment, entities are highlighted within a document preview and color-coded based on the entity type. In another embodiment, potential entities are displayed within a cluster diagram that organizes the entities in various ways. Initially, natural language processing and type-based lists are used to automatically deduce which words are entities and their types. Feedback is provided by a user through the interface 124 to correct some or all of the entities and/or types or to validate the current configuration. Modifications or validations are fed back into the language processing algorithms and/or type-based list to create a learning loop that continually improves itself. SLET saves time by allowing the user to only verify the accuracy of pre-computed entities and inaccurate guesses will rapidly decrease through use of the document relationship analysis system 110. These updates may also be collaborative in nature, thereby allowing combination of efforts from multiple users.

In an execution operation 512, the query is executed against the target dataset using either or both of the recommender component and discovery component. For example, the interface 124 may include an interactive control (e.g., a button) that is selectable in order to execute the query. In response to execution of the query, a result dataset containing documents of interest selected from the target dataset is generated. In some embodiments, restrictions may be placed on the size or type of result datasets generated by the execution operation 512. For instance, the dataset manager component 132 may be configured to limit result datasets to a particular number of documents.

In a result storage operation 514, the dataset manager component 132 stores result datasets in the user properties database 122 for subsequent use (e.g., visualization or export).

Operations 502 through 514 may be repeated on an iterative basis against datasets stored by the document relationship analysis system 110. Iteration may be performed manually by a user 104 or automatically by the dataset manager component 132 based on schedule or in response to a triggering event, which generates updated result datasets without further action from the user 104, which may be analyzed at the convenience of the user. For instance, a user 104 may wish to repeat these steps as new source documents 106 in a dynamic stream of documents are ingested by the document relationship analysis system 110. Embodiments of the document relationship analysis system 110 automatically send a notification or the updated result dataset to a specified user 104 via email or some other reporting method via the system's export component 136.

Figure 6A:
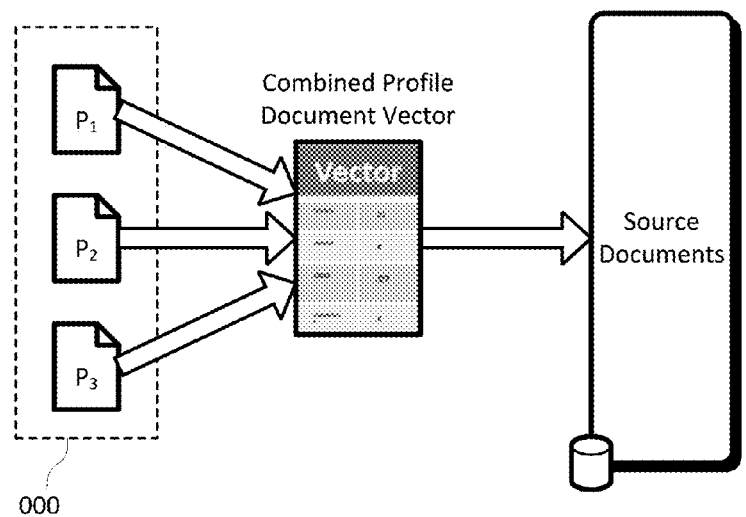
FIG. 6A illustrates one embodiment of the coarse-grain filtering capabilities of the dataset manager component's recommender component.

FIG. 6A illustrates the creation of a coarse-grain, filtered result dataset obtained by comparing a single, combined profile document vector to each document vector stored in the target dataset using the recommender component during the result generation operation.

Figure 6B:
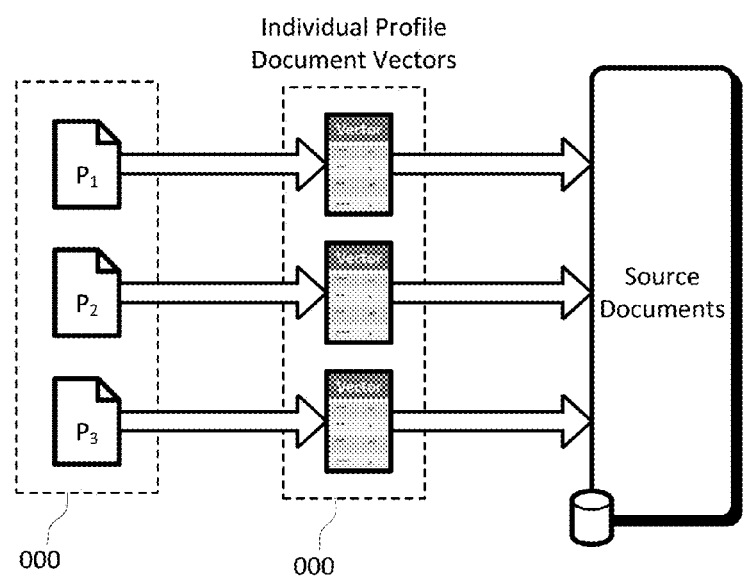
FIG. 6B illustrates one embodiment of the fine-grain categorization capabilities of the dataset manager component's recommender component.

FIG. 6B illustrates the creation of a fine-grain, categorized result dataset by comparing the plurality of individual profile document vectors with each document vector stored in the target dataset using the recommender component during the result generation operation.

Figure 7:
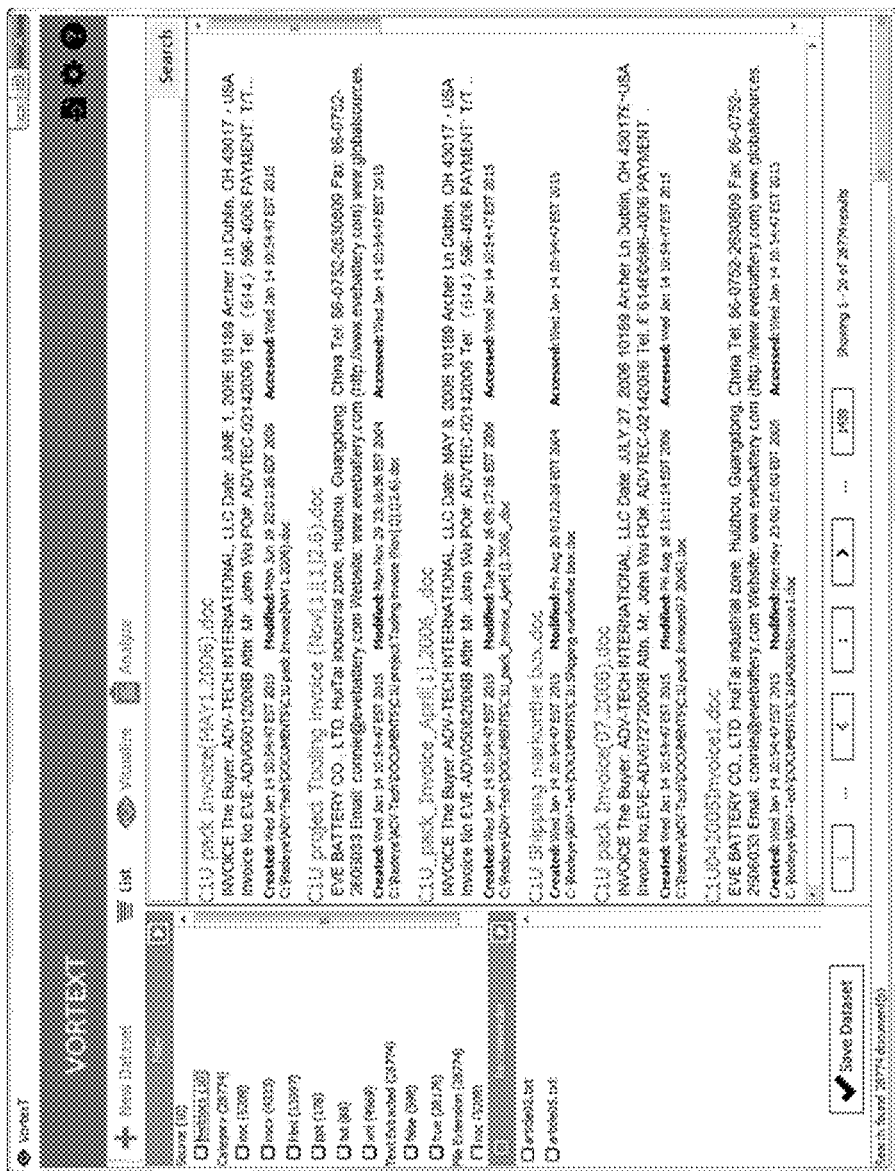
FIG. 7 is an exemplary screenshot illustrating aspects of the interface for the dataset manager component.

FIG. 7 is an exemplary screenshot illustrating aspects of the interface for the dataset manager component.

Figure 8:
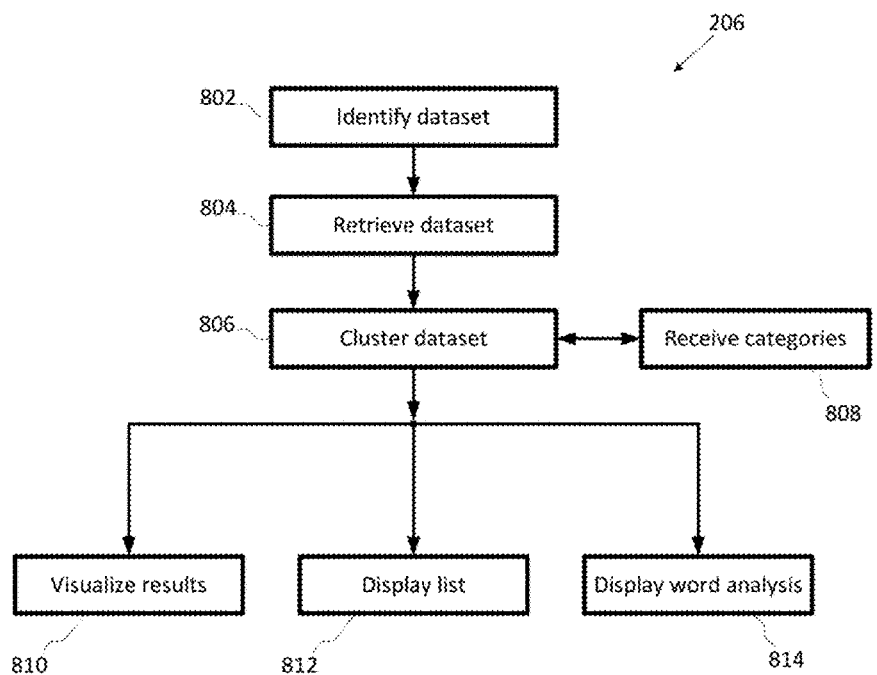
FIG. 8 is a high level flowchart illustrating aspects of the visualization operation performed by the relationship analyzer component.

FIG. 8 is a high level flowchart illustrating aspects of the visualization operation performed by the relationship analyzer component. The relationship analyzer component 134 is usable at any point following the ingestion of the source documents 106; however, it is typically used to analyze relationships between documents contained within a result dataset generated by the dataset manager component.

The visualization operation 206 begins with a dataset selection operation 802 in which the relationship analyzer component 134 receives an identification or selection of a dataset of documents 106 for analysis. In various embodiments, the dataset selection is received via the interface 124. The selected dataset includes some or all of the documents 106 ingested into the document relationship analysis system 110. Any documents or datasets stored by the document relationship analysis system 110 are selectable.

In a dataset retrieval operation 804, the relationship analyzer component 134 retrieves the selected dataset and associated information, such as previously computed document vectors and previous result datasets, from the appropriate databases.

In a clustering operation 806, document vectors calculated for the retrieved dataset are clustered by the relationship analyzer component 134. The clustering mechanism applied by the relationship analyzer component 134 is selected based on dataset size thresholds. For instance, the relationship analyzer component 134 may choose to cluster document vectors using a Phylips Tree if the dataset contains fewer than a threshold number of documents (e.g., less than a few hundred documents), or may generate a single level cluster to be displayed via tree map if the dataset is larger than the threshold number of documents. In various embodiments, the clustering thresholds are configurable, via the interface 124, allowing users to optimize and customize the visualization of datasets according to personal preference or specific requirements.

When document vectors have been pre-computed and stored by the ingest component 130 and/or when a previous result dataset has been generate stored (e.g., when updating an analysis of a streaming dataset), the relationship analyzer component exhibits improved performance and faster clustering of the datasets as significantly fewer computations are required.

In a categorization operation 808, the relationship analyzer component 134 receives a selection of document categories to be applied to the retrieved dataset. Categories consist of a set of words that each document is compared against and a document is assigned to the category with the highest percentage match using the TF-ICF algorithm. When a document matches no category above some pre-defined amount it falls into a special "Unknown" category. Each document is assigned one and only one document category. One or more categories may be enabled or disabled, via the interface 124, to include or exclude associated documents when visualizing the result dataset.

In a visualization optimization operation 810, the relationship analyzer component 134 determines the size of the retrieved dataset and determines which type of visualization to display by applying a set of rules based on the predetermined (e.g., default or user configured) measures of dataset characteristics, including size. The user interface 124 provides interactive controls for defining and fine tuning the measures used by the relationship analyzer component 134 to select a particular type of visualization to display. The cluster information generated by the relationship analyzer component 134 is displayed for visualization through the use of various visualization models including, without limitation, cluster diagrams and tree maps. Visualizing connections within very large datasets is difficult, if not impossible, given existing visualization techniques. One example, without limitation, of a suitable cluster diagram is a Phylips Tree, which represents clusters of similar documents using nodes and links. The nodes of the tree represent the documents while the links between nodes represent relationships. Generally, the closer two nodes are, the more similarity there is between two documents. If links share a vertex, then the linked documents are the closest in the set of documents. The longer the links are between documents, the greater the dissimilarity is between the documents. While useful for smaller datasets, node-based cluster diagrams are not well suited for visually displaying clusters of document vectors when the number to display is very large, a few hundred documents or more.

To convey useful information about large datasets, the relationship analyzer component 134 employs a variety of additional visualization techniques better adapted visualize relationship between large volumes of documents than existing cluster diagrams presently allow for. These additional visualization techniques, when combined with other aspects of the present disclosure, allow for automation of a greater portion of the text analysis process and visualization of relationships within large volumes of documents with an unprecedented level of clarity and ease of analysis. By automatically selecting and presenting a suitable visualization technique based on features of the result dataset, such as and without limitation, the number of documents and the number of categories associated with a result dataset, analysts are able to more efficiently perform their job, be it document triage, entity extraction, term matching, etc.

In a list display operation 812, the relationship analyzer component 134 displays the clustered dataset as a list of documents via the interface 124. The list may include, but is not limited to, information about how the dataset clustered, as well as which categories to which the documents correspond. In various embodiments, the interface 124 provides selectable controls (e.g., interactive nodes) for drilling down into the list while navigating the cluster visualization, so that the list reflects the subset of documents corresponding to the selected node. For example, selecting a node in the cluster visualization updates the scope of the list to the documents associated with (e.g., linked to) the selected node.

In a word analysis operation 814, the relationship analyzer component 134 applies word analysis to calculate frequencies for features of the documents 106, such as, but not limited to, words, phrases, and entities, and identify which features are statistically significant. Significance is a measure (e.g., a score) based on the relative frequency of a particular feature relative to its occurrence in the corpus. Generally, words occurring frequently within the corpus are common and are attributed with less significance, while words occurring less frequently within the corpus are attributed with greater significance. As with the lists, the interface 124 provides selectable controls for drilling down into the word analysis while navigating the cluster visualization to have the word analysis reflect a subset of documents corresponding to a selected node within the cluster visualization. For example, selecting a node in the cluster visualization updates the scope of the word analysis to the documents associated with (e.g., linked to) the selected node.

Figure 9:
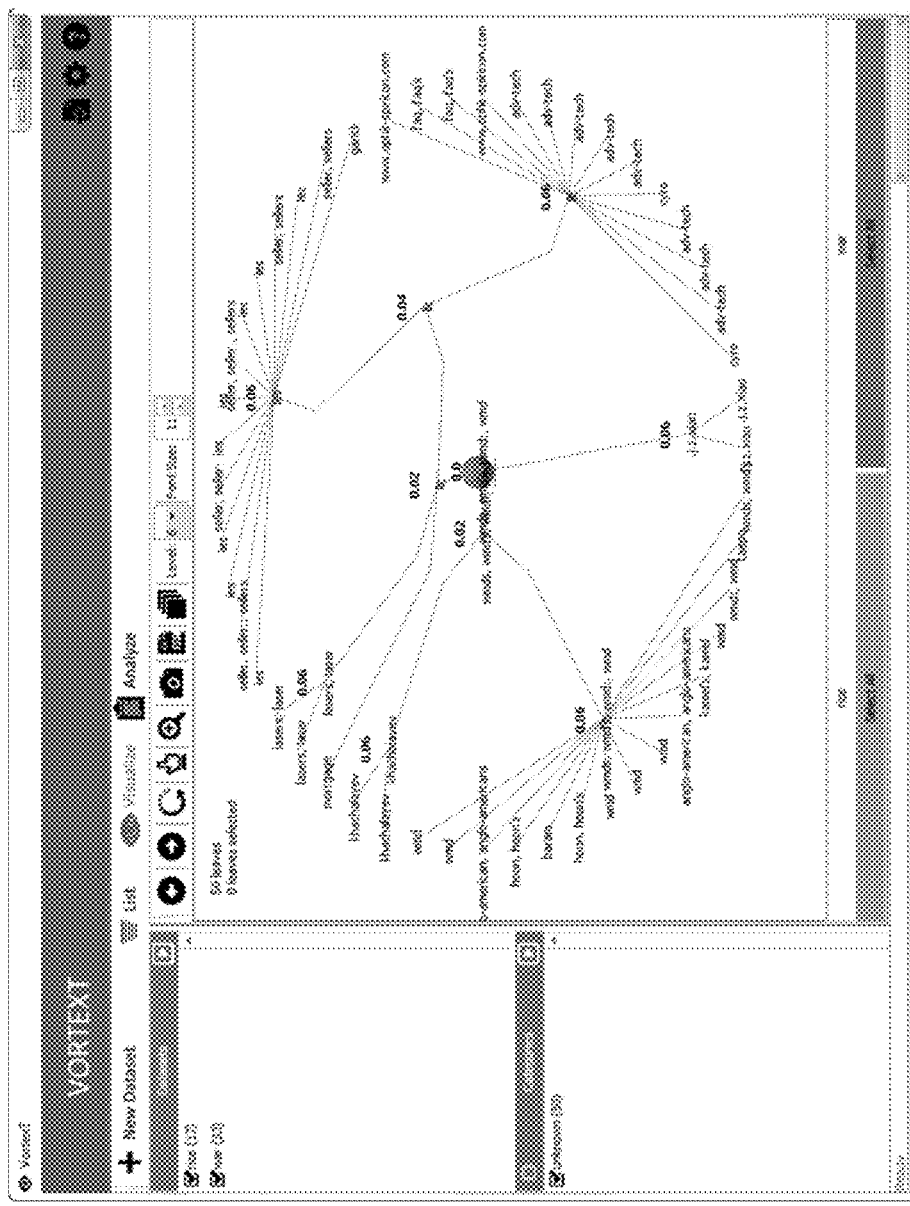
FIG. 9 is an exemplary screenshot illustrating aspects of the interface for the relationship analyzer component.

FIG. 9 is an exemplary screenshot illustrating aspects of the interface for the relationship analyzer component.

Figure 10:
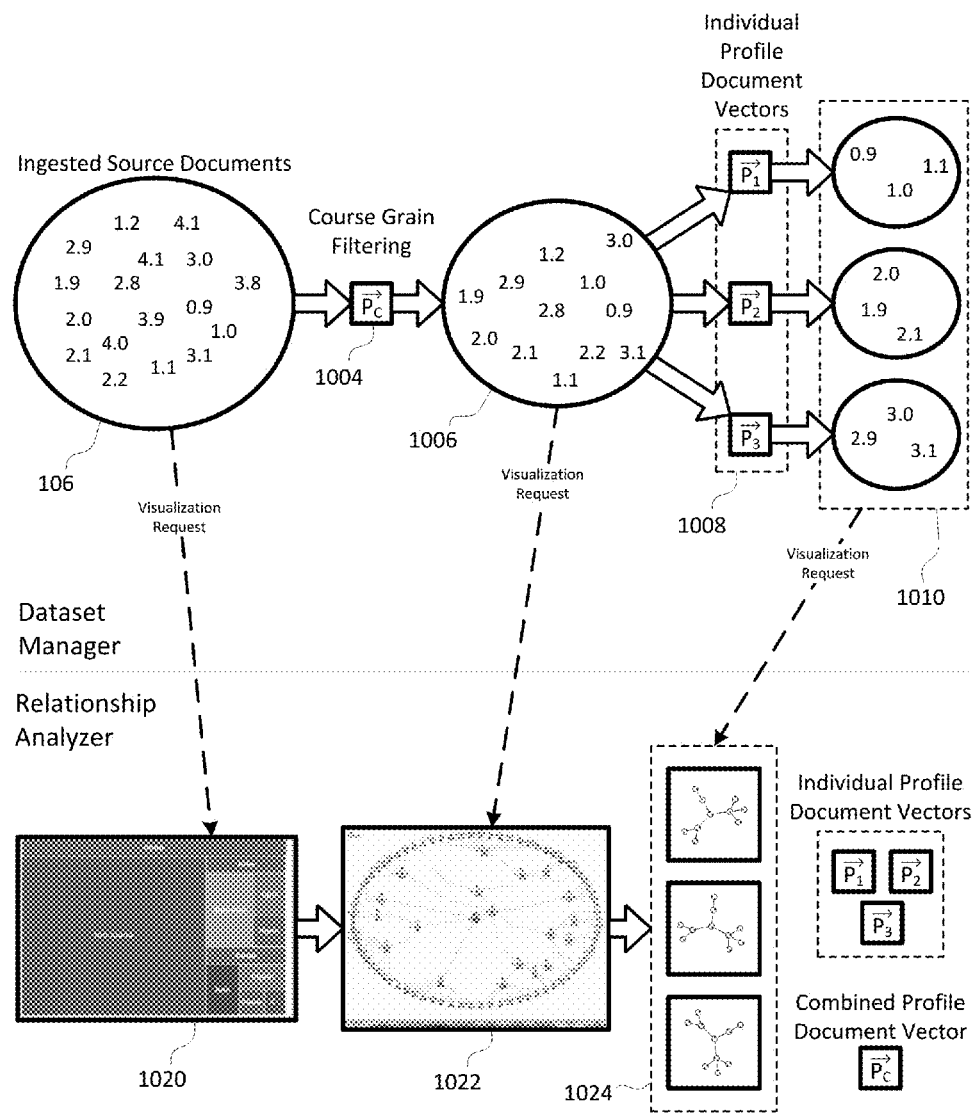
FIG. 10 graphically illustrates aspects of automatic contextualized visualization of datasets by the document relationship analysis system.

FIG. 10 graphically illustrates aspects of automatic contextualized visualization of datasets by the document relationship analysis system. The upper flow path represents the datasets and the operations thereon in the data manager component 132. The lower flow path represents the automatically selected visualization of the dataset rendered by the relationship analyzer component 134 for each dataset.

At the beginning of the upper flow path, a large dataset containing multiple thousands of ingested source documents is selected. In this example, a basic query is processed using the discovery component with no filter simply to see the relationships between the source documents based on a named-entity, such as mention of a geographical region (e.g., a continent or country). The large resulting dataset contains too many documents and relationships to be visualized using a cluster tree. Instead, because of the large number of documents in the result set, the relationship analyzer component 134 renders a tree map 1020 clustering documents associated with a particular region into blocks sized relative to the number of documents associated with the cluster, as seen in the lower flow path, on a display via the interface 124. At this level, individual relationships between documents are not visible.

To refine the dataset, a combined profile document vector 1004 is used to generate a coarse-grain, filtered result dataset 1006, as illustrated in the upper flow path. In this example, the coarse-grain, filtered result dataset 1006 contains only a few hundreds of the original source documents, which is small enough for the relationship analyzer component 134 to render a cluster diagram 1022 showing relationships between individual documents, as seen in the lower flow path.

In a further refinement of the dataset, individual profile document vectors 1008 to create a fine-grain, categorized result dataset 1010 using the recommender component to focus on a categorized subset of the filtered dataset 1006, as illustrated in the upper flow path. In this example, each category in the fine-grain, categorized result dataset 1006 contains only a few tens of documents. Accordingly, the relationship analyzer component 134 renders a plurality of smaller cluster diagrams 1024, as seen in the lower flow path. Alternatively, the relationship analyzer component 134 could render the fine-grain, categorized result dataset 1006 as a list of documents, a word analysis report, or using some other visualization technique suitable for small datasets.

Figure 11:
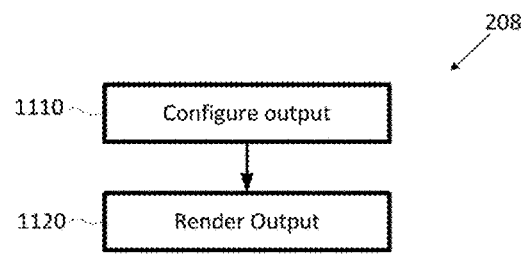
FIG. 11 is a high level flowchart illustrating aspects of the export operation performed by the export component.

FIG. 11 is a high level flowchart illustrating aspects of the export operation performed by the export component. In a configuration operation 1110, the export component 136 is configured via the interface 124 to export selected information from the document relationship analysis system 110. Examples of the types of information that may be exported by the export component 136 include, without limitation, a visualization, a list, and/or a word analysis report for some or all of the source documents in or the documents of interest identified by the document relationship analysis system 110.

In an output operation 1120, the export component 136 sends the selected information to a file, output device, or another application or device. For example, the export component 136 may send a word analysis report to a word processing application or a spreadsheet application or other data analytics application for use in a report or manual analysis or a visualization, such as a cluster diagram, or to a printer for creating a static copy of the information.

Figure 12:
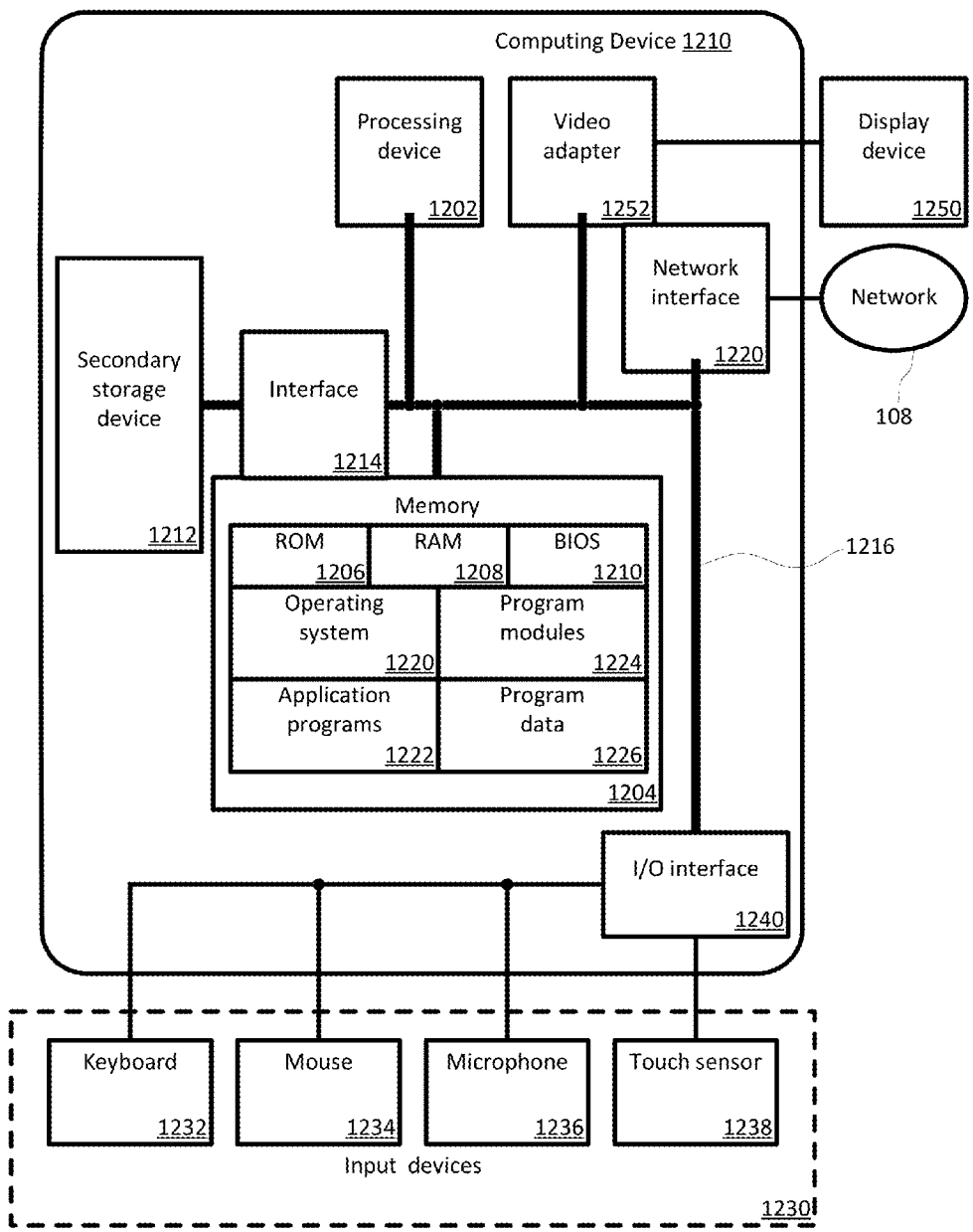
FIG. 12 illustrates an exemplary architecture of a computing device suitable for implementing aspects of the present disclosure.

FIG. 12 is an exemplary architecture of a computing device suitable for implementing aspects of the present disclosure. The illustrated computing device may be used to execute the operating system, application programs, and software components (including the software engines) described herein. Examples of suitable computing devices include, but are not limited to, servers, personal computers, laptop computers, tablet or surface computers, and smart phones.

The computing device 1200 includes, in some embodiments, at least one processing device 1202, such as a central processing unit (CPU). A variety of processing devices are available from a variety of manufacturers, for example, Intel® or Advanced Micro Devices®. In this example, the computing device 1200 also includes a system memory 1204, and a system bus 1216 that couples various system components including the system memory 1204 to the processing device 1202. The system bus 1216 is one of any number of types of bus structures including a memory bus, or memory controller; a peripheral bus; and a local bus using any of a variety of bus architectures.

Examples of computing devices suitable for the computing device 1200 include a desktop computer, a laptop computer, a tablet computer, a mobile computing device (such as a smart phone, a tablet device, or other mobile devices), or other devices configured to process digital instructions.

The system memory 1204 includes read only memory 1206 and random access memory 1208. A basic input/output system 1210 containing the basic routines that act to transfer information within computing device 1200, such as during start up, is typically stored in the read only memory 1206.

The computing device 1200 also includes a secondary storage device 1212 in some embodiments, such as a hard disk drive, for storing digital data. The secondary storage device 1212 is connected to the system bus 1216 by a secondary storage interface 1214. The secondary storage devices 1212 and their associated computer readable media provide nonvolatile storage of computer readable instructions (including application programs and program modules), data structures, and other data for the computing device 1200.

Although the exemplary environment described herein employs a hard disk drive as a secondary storage device, other types of computer readable storage media are used in other embodiments. Examples of these other types of computer readable storage media include magnetic cassettes, flash memory cards, digital video disks, Bernoulli cartridges, compact disc read only memories, digital versatile disk read only memories, random access memories, or read only memories. Some embodiments include non-transitory media. Additionally, such computer readable storage media may include local storage or cloud-based storage.

A number of program modules may be stored in secondary storage device 1212 or memory 1204, including an operating system 1220, one or more application programs 1222, other program modules 1224, and program data 1226. The computing device 1200 may utilize any suitable operating system, such as Microsoft® Windows®, Google Chrome™, Apple OS, UNIX®, Unix-like operating systems (e.g., Linux), and any other operating system suitable for a computing device. Other examples may include Microsoft, Google, Apple operating systems, or any other suitable operating system used in tablet computing devices.

In some embodiments, a user provides inputs to the computing device 1200 through one or more input devices 1230. Examples of input devices 1230 include a keyboard 1232, mouse 1234, microphone 1236, and touch sensor 1238 (such as a touchpad or touch sensitive display). Other embodiments include other input devices 1230. The input devices are often connected to the processing device 1202 through an input/output interface 1240 that is coupled to the system bus 1216. These input devices 1230 may be connected by any number of input/output interfaces, such as a parallel port, serial port, game port, or a universal serial bus. Wireless communication between input devices and the interface 1240 is possible as well, and includes infrared, Bluetooth® wireless technology, 702.11a/b/g/n, cellular, or other radio frequency communication systems in some possible embodiments.

In this example embodiment, a display device 1250, such as a monitor, liquid crystal display device, projector, or touch sensitive display device, is also connected to the system bus 1216 via an interface, such as a video adapter 1252. In addition to the display device 1250, the computing device 1200 may include various other peripheral devices (not shown), such as speakers or a printer.

When used in a local area networking environment or a wide area networking environment (such as the Internet), the computing device 1200 is typically connected to the network 108 through a network interface 1254, such as an Ethernet interface. Other possible embodiments use other communication devices. For example, some embodiments of the computing device 1200 include a modem for communicating across the network.

The computing device 1200 typically includes at least some form of computer readable media. Computer readable media includes any available media that may be accessed by the computing device 1200. By way of example, computer readable media include computer readable storage media and computer readable communication media.

Computer readable storage media includes volatile and nonvolatile, removable and non-removable media implemented in any device configured to store information such as computer readable instructions, data structures, program modules, or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that may be used to store the desired information and that may be accessed by the computing device 1200.

The computing device 1200 is also an example of programmable electronics, which may include one or more such computing devices, and when multiple computing devices are included, such computing devices may be coupled together with a suitable data communication network so as to collectively perform the various functions, methods, or operations disclosed herein.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed is:

1. A system for analyzing relationships between documents, the system comprising:
    a user interface;
    an ingest memory configured to store source documents retrieved from an external document source;
    a text index memory configured to store a text index;
    a cluster index memory configured to store document vectors associated with each source document;
    a text extraction pipeline automatically extracting text from source documents added to the ingest memory;
    a document vector calculator automatically computing document vectors for source documents by applying term weights to the extracted text associated with the source document, the document vector calculator generating a plurality of profile document vectors associated with profile documents selected for use in a query against a target dataset;
    an indexer automatically building an index of the extracted text and storing the text index in the text index memory;
    a dataset manager component generating a result dataset containing documents of interest from a target dataset containing selected source documents based on a query by evaluating similarities between each profile document vector and the document vector calculated for each source document in the target dataset; and
    a relationship analyzer component automatically selecting a visualization model for clustering the documents of interest based the number of documents of interest in the result dataset and rendering the result set using selected visualization model in the user interface.

2. The system of claim 1 wherein the document vector calculator applies term weights to the extracted text using Term Frequency—Inverse Corpus Frequency.

3. The system of claim 1 further comprising a language detection component automatically detecting a language of the extracted text.

4. The system of claim 1 wherein the text extraction pipeline further comprises:
    a plurality of text extraction components to extract text from source documents;
    a document queue containing a list of the source documents added to the ingest memory; and
    a scheduler routing each source document from the document queue to one of the text extraction components based on an evaluation of features of the source documents against scheduling parameters.

5. The system of claim 4 wherein the text extraction components are divided into a small file text extraction path and a large file extraction path.

6. The system of claim 1 further comprising:
    a user property memory configured to store profile documents; and
    wherein the document vector calculator automatically computes document vectors for profile documents added to the user property memory.

7. The system of claim 6 wherein the dataset manager component further comprises a recommender component and discovery component.

8. The system of claim 7 further comprising:
    a combined profile document vector generated from document vectors calculated for a plurality of profile documents selected for use in a query against a target dataset; and
    a result dataset generated by evaluating similarities between the combined profile document vector and the document vector calculated for each source document in the target dataset.

9. The system of claim 7 further comprising:
    a plurality of profile document vectors associated with profile documents selected for use in a query against a target dataset; and a result dataset generated by evaluating similarities between each profile document vector and the document vector calculated for each source document in the target dataset.

10. The system of claim 1 further comprising an export component for outputting result datasets in formats readable by external applications.

11. A method of analyzing relationships between documents, the method comprising the acts of:
    extracting text from source documents received from an external document source;
    storing the extracted text;
    creating an index of the extracted text;
    computing a document vector for each source document using the extracted text automatically when the extracted text is stored;
    storing the document vectors for each source document;
    extracting text from profile documents received from an external document source;
    storing the extracted text from the profile documents;
    computing a document vector for each profile document using the extracted text automatically when the extracted text is stored;
    computing a combined profile document vector from the profile document vectors of selected profile documents associated with a query;
    receiving a selection of a plurality of source documents as a target dataset and parameters of a query via a user interface;
    generating a result dataset containing documents of interest from the target dataset based on the query by evaluating similarities between the combined profile document vector and the document vector calculated for each source document in the target dataset; and
    automatically selecting a visualization model for clustering the documents of interest based the number of documents of interest in the result dataset and rendering the result set using selected visualization model in a user interface.

12. The method of claim 11 further comprising the acts of:
    indexing the extracted text from each source document automatically when the extracted text is stored; and
    storing the indexed text.

13. The method of claim 11 wherein the act of extracting text from source documents received from an external document source further comprises the act of automatically routing each source document to a text extraction component selected from a plurality of text extraction components based on an evaluation of features of the source document against at least one scheduling parameter.

14. The method of claim 13 wherein the at least one scheduling parameter is selected from a file size, a file type, a blacklist associated with the text extraction component, and a whitelist associated with the text extraction component.

15. The method of claim 13 wherein the act of act of automatically routing each source document to a text extraction component further comprises the acts of:
    routing source documents having a file size less than a first size threshold to a small text file extraction component configured for extracting text from files with file sizes less than the first size threshold;
    routing source documents having a file size greater than a second size threshold to a large text file extraction component configured for extracting text from files with file sizes greater than the second size threshold;
    routing source documents having a file size between the first size threshold and the second size threshold to either the small text file extraction component or the large text file extraction component based a weighted average of sizes of source documents having a file size between the first size threshold and the second size threshold.

16. The method of claim 11 further comprising the acts of:
    extracting text from profile documents received from an external document source;
    storing the extracted text from the profile documents;
    computing a document vector for each profile document using the extracted text automatically when the extracted text is stored; and
    generating a result dataset by evaluating similarities between each profile document vector and the document vector calculated for each source document in the target dataset.

17. The method of claim 11 further comprising the acts of:
    extracting text from profile documents received from an external document source;
    storing the extracted text from the profile documents;
    computing a document vector for each profile document using the extracted text automatically when the extracted text is stored;
    computing a combined profile document vector from the profile document vectors of selected profile documents associated with a query;
    generating a result dataset by evaluating similarities between the combined profile document vector and the document vector calculated for each source document in the target dataset.

18. The method of claim 11 further comprising the act of detecting a language associated with the extracted text of a source document based on the probability of characters in the extracted text appearing in a particular language.

19. The method of claim 11 wherein the act of act of detecting a language further comprises the acts of:
    calculating the probability of the characters in the extracted text appearing in a particular language using multiple code pages;
    evaluating the probabilities associated with each code page against the source documents to select the language of the source document.

20. A computer readable medium containing computer executable instructions which, when executed by a computer, perform a method for analyzing relationships between documents, the method comprising the acts of:
    extracting text from source documents received from an external document source;
    storing the extracted text;
    creating an index of the extracted text;
    indexing the extracted text from each source document automatically when the extracted text is stored;
    storing the indexed text;
    computing a document vector for each source document using the extracted text automatically when the extracted text is stored;
    storing the document vectors for each source document;
    extracting text from profile documents received from an external document source;
    storing the extracted text from the profile documents;
    computing a document vector for each profile document using the extracted text automatically when the extracted text is stored;

computing a combined profile document vector from the profile document vectors of selected profile documents associated with a query;

receiving a selection of a plurality of source documents as a target dataset and parameters of a query via a user interface;

generating a result dataset containing documents of interest from the target dataset based on the query by evaluating similarities between the combined profile document vector and the document vector calculated for each source document in the target dataset; and automatically selecting a visualization model for clustering the documents of interest based the number of documents of interest in the result dataset and rendering the result set using selected visualization model in a user interface.

* * * * *